US008832562B2

(12) United States Patent
de Brebisson

(10) Patent No.: US 8,832,562 B2
(45) Date of Patent: Sep. 9, 2014

(54) GRAPHICAL CALCULATOR USER INTERFACE FOR FUNCTION DRAWING

(75) Inventor: Cyrill de Brebisson, Boise, ID (US)

(73) Assignee: Hewlett-Packard Development Company, L.P., Houston, TX (US)

(*) Notice: Subject to any disclaimer, the term of this patent is extended or adjusted under 35 U.S.C. 154(b) by 1858 days.

(21) Appl. No.: 10/636,752

(22) Filed: Aug. 8, 2003

(65) Prior Publication Data

US 2005/0033782 A1 Feb. 10, 2005

(51) Int. Cl.
*G06F 15/00* (2006.01)
*G06F 13/00* (2006.01)
*G06F 15/02* (2006.01)

(52) U.S. Cl.
CPC .................................. *G06F 15/025* (2013.01)
USPC .......................................... 715/743; 715/746

(58) Field of Classification Search
CPC ..................................................... G06F 15/025
USPC ......... 715/840, 765, 709, 746, 763, 826, 827, 715/741, 743, 731, 800, 700; 345/440, 156, 345/160, 171
See application file for complete search history.

(56) References Cited

U.S. PATENT DOCUMENTS

| | | | | |
|---|---|---|---|---|
| 5,535,317 | A * | 7/1996 | Tanaka et al. | 345/440 |
| 6,874,005 | B2 * | 3/2005 | Fortenberry et al. | 708/130 |
| 6,922,710 | B2 * | 7/2005 | Child et al. | 708/162 |
| 2003/0122776 | A1 * | 7/2003 | Fortenberry et al. | 345/156 |
| 2003/0145284 | A1 * | 7/2003 | Fortenberry et al. | 715/517 |
| 2003/0182333 | A1 * | 9/2003 | Good et al. | 708/131 |

OTHER PUBLICATIONS

"User's guide: fx-975OG PLUS/CFX-985OG PLUS/CFX-985OGB PLUS/CFX-9850GC PLUS/CFX-9950GB PLUS manual"[Online] 1998, XP002409292.

* cited by examiner

*Primary Examiner* — Kevin Nguyen

(57) ABSTRACT

A method of graphing an expression on a calculator display includes, in response to only receiving as input an expression to be graphed, graphing the received expression on a calculator display as described. A calculator for graphing a user-entered expression includes means for receiving and displaying a user-entered expression and means for graphing the received expression on a calculator display responsive to receiving only the user-entered expression.

19 Claims, 22 Drawing Sheets

GRAPHICAL CALCULATOR USER INTERFACE FOR FUNCTION DRAWING

RELATED APPLICATIONS

This application is related to each of the following applications: "Function Drawing in Polar Plan Using a Calculator" (U.S. patent application Ser. No. 10/636,781); "Input and Evaluation of Fractions Using a Calculator" (U.S. patent application Ser. No. 10/636,785); "Previous Calculation Reuse in a Calculator" (U.S. patent application Ser. No. 10/636,778); and "Graphical Calculator" (U.S. patent application Ser. No. 10/636,780), each assigned to the present assignee, all of which are hereby incorporated by reference in their entirety, and all of which are being filed concurrently herewith.

FIELD OF THE INVENTION

The present invention relates to a method of and apparatus for an improved graphical calculator having a user interface for graphing expressions.

BACKGROUND

A hand-held calculator is an important and useful device. Similar to a computer, the hand-held calculator has a processor, a memory, a display, and an input device; however, there are important distinguishing differences between the hand-held calculator and the computer.

The hand-held calculator is a specialized device and not a general purpose device; as is true of a computer. Because of this specialization, typically the hand-held calculator costs less, has a longer useful lifespan, and is more reliable and more portable than the computer.

Whereas a general purpose computer is capable of executing many different programs, a hand-held calculator typically executes a single program and less frequently supports execution of user-created programs. Normally, a hand-held calculator supports addition, subtraction, multiplication, and division of numbers, either integer-based or decimal-based, entered by a user and displays the results on a built-in display.

A graphical calculator is a further specialized version of a hand-held calculator having a display which is typically larger than a regular hand-held calculator display in order to enable graph output. In many instances, graphical calculator displays are liquid crystal displays for more accurate representation and enhanced readability of a graph output.

A graphical calculator is able to display a graph of a specific expression, e.g. a sine wave representing a sinusoidal function, entered by a user. Disadvantageously, graphical capabilities on hand-held calculators are only available as part of expensive and complex, "high end" scientific calculators. These graphical calculators are more expensive than other calculators, typically costing hundreds of dollars. These graphical calculators are more complicated to operate than other calculators because of the large amount of functionality incorporated therein.

The increased functionality has required a corresponding increase in the number of keys required for manipulating and using the calculator. For example, currently available graphical calculators have approximately fifty (50) keys including two (2) shift or modifier keys for a user to manipulate, e.g. a Texas Instruments (TI) 83 plus calculator has 51 keys and two (2) shift keys which can be used concurrently, enabling up to four functions to be assigned per the 51 remaining keys, and a Hewlett-Packard (HP) 48G+/GX calculator has 49 keys and three (3) shift keys, enabling up to six functions to be assigned per the remaining 49 keys.

Additionally, and in conjunction with the larger number of keys present, a user must contend with different modes of operation of the current graphical calculator. Different modes of operation, accessible via specific keys and/or key sequences, must be utilized in order to access specific calculator functionality, e.g. a graphical calculator may include a fraction mode, a decimal mode, a binary mode, a hexadecimal mode, a finance mode, a statistics mode, and a graph mode.

Further, expression input requires increasingly complicated key manipulations and combinations. For example, in order to graph an expression, there are typically three combinations to be entered: a mode specifying combination, an expression entry combination, and a completion combination. The mode specifying combination may include manipulation of a graph key to instruct the calculator to graph the following expression entry. The expression entry combination may include manipulation of multiple keys to input the expression to be graphed and the completion combination includes manipulation of a key, e.g. an enter key, to instruct the calculator to perform the preceding operations, i.e. graph the entered expression.

Requiring a user to manipulate multiple keys increases the need for learning, the possibility of error and may lead to frustration on the part of the user. Also, requiring additional key presses by a user requires more time and slows the entry and use of the calculator by the user. The addition of multiple modes, complicated expression input combinations, and ever increasing numbers of keys results in a very complicated device.

As further evidence of increasing complexity, the user manual for a currently available hand-held graphical calculator has dramatically increased in size in order to fully explain the use of the calculator. For example, the above-cited TI-83 plus calculator manual includes 269 pages and the HP 48G+/GX calculator manual includes 506 pages. These are very long documents which are typically not read by users. Further, users are likely to be deterred from reading the manual because of the imposing size of the manual.

Graphical calculators are very popular and effective educational aides. School students using graphical calculators can easily visualize complex functions; however, the complexity and cost of currently available graphical calculators deters many students and schools from making a purchase. Purchasers are dissuaded by the size of the manual, multiple modes of operation, and the number of keys and key combinations required for inputting expressions.

Prior hand-held calculators of which the inventor is aware, enable a user to input mathematic expressions for display on a display in a graphical representation. For example, FIG. 8 depicts a graphical representation of the mathematical expression F(x)=sin(x) in a Cartesian coordinate system. Prior approaches for calculators receiving a mathematic expression for graphing include a graphing mode and designation of a graphing key.

Using a graphing mode and designating a graphing key both require a user to manipulate a designated key on the calculator thereby providing input to the calculator indicating that the subsequently entered expression is to be evaluated and a graphical representation thereof displayed. Disadvantageously, the user is required to learn and memorize an additional calculator mode and corresponding activation key, and manipulate additional keys for expression entry. Problematically, the user is more likely to mis-key either the designated graphing mode key or the expression and, at a minimum, additional keystrokes are required to command the calculator to display the graph. Additional keystrokes necessitates more complexity, more time for input, and increased chance of an input error and frustration for the user.

Further disadvantageously, the use of a designated graphing key is expensive in terms of cost and keyboard area for implementation. Additionally, the increased calculator complexity requires a corresponding increase in the size of the user manual needed to describe operation of the calculator to the user.

There is a need in the art for a method of and apparatus for an improved graphical calculator having a user interface for graphing expressions.

SUMMARY

It is therefore an object of the present invention to provide a method of and apparatus for an improved graphical calculator having a user interface for graphing expressions.

The present invention provides a method of and apparatus for an improved graphical calculator having a user interface for graphing expressions.

A method aspect of an improved graphical calculator having a user interface for graphing expressions includes in response to only receiving as input an expression to be graphed, graphing the received expression on a calculator display.

An apparatus aspect of an improved graphical calculator having a user interface for graphing expressions includes means for receiving and displaying a user-entered expression and means for graphing the received expression on a calculator display responsive to receiving only the user-entered expression.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention.

DESCRIPTION OF THE DRAWINGS

The present invention is illustrated by way of example, and not by limitation, in the figures of the accompanying drawings, wherein elements having the same reference numeral designations represent like elements throughout and wherein.

DETAILED DESCRIPTION

Figure 1:
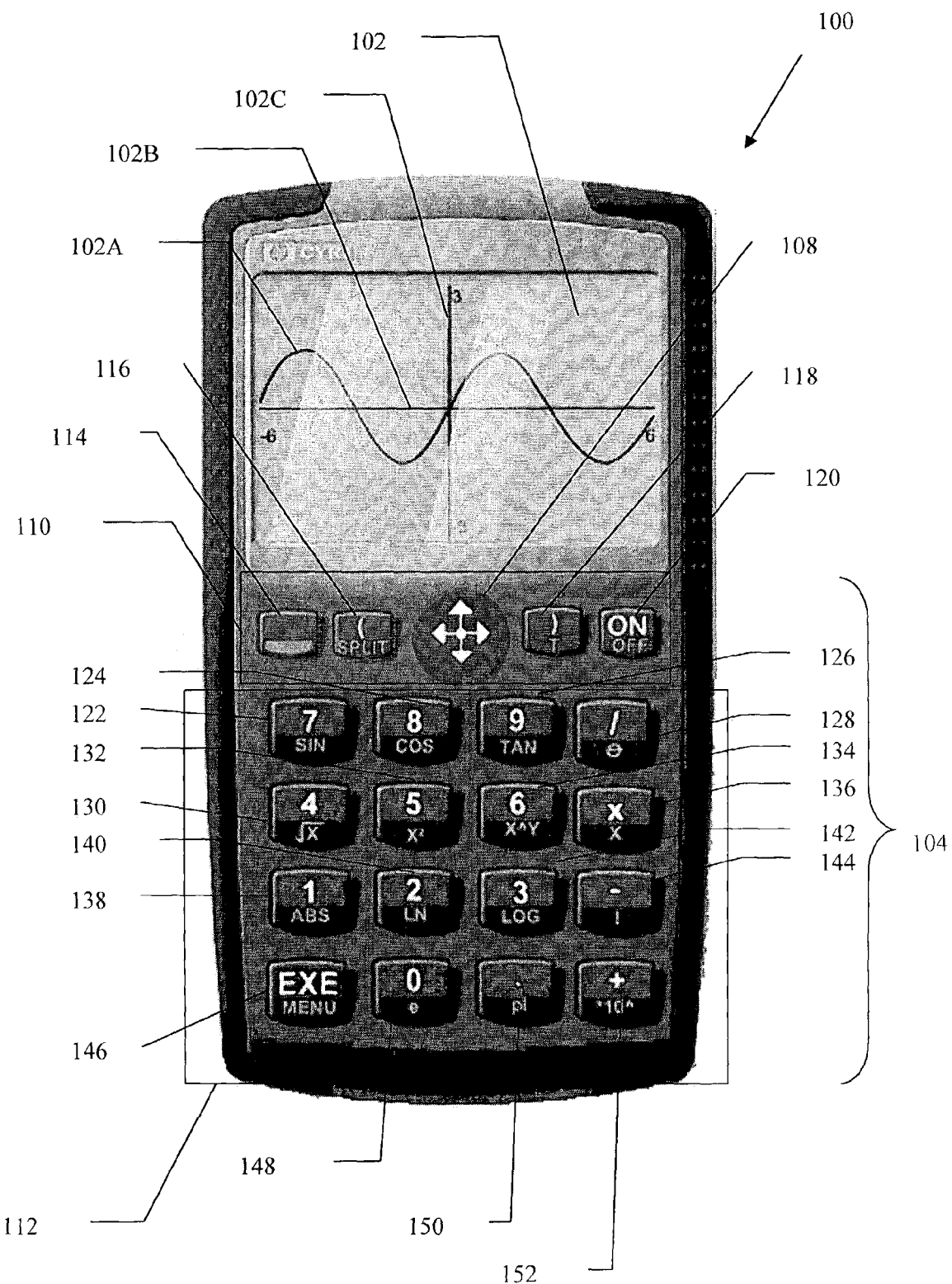
FIG. 1 is a front face view of a graphical calculator according to an embodiment of the present invention.

FIG. 1 is a front face view of a graphical calculator 100 according to an embodiment of the present invention.

Calculator 100 includes a display 102 and a primarily key-based input area 104 set in a front face 106. Although front face 106 is depicted as a rounded rectangle, it is to be understood that the front face may be manufactured to be any of a number of different shapes. Further, although a specific number, type and configuration of input mechanisms are described below, it is to be understood that variations in the number, type, and configuration of input mechanisms may be found in different embodiments of the present invention.

Display 102 is a rectangular liquid crystal display (LCD) which is 96 pixels wide and 64 pixels in height. As shown in FIG. 1, display 102 displays a sine wave 102A on a graph having an X axis 102B and a Y axis 102C. Input area 104 includes four keys and one directional input device 108 in a row 110 and 16 keys arranged in a four by four grid 112. Although a four by four grid is depicted and described, it is to be understood that the input area keys may be arranged in different configurations.

Directional input device 108 is used to navigate menus and perform information input, recall, and editing. Directional input device 108 may be manipulated by the user to input at least four directions, i.e. up, down, left, and right to calculator 100. Input of the left arrow of directional input device 108 inputs a move left command to processor 204 thereby moving the current cursor position on display 102 to the left one position. Input of the right arrow of directional input device 108 inputs a move right command to processor 204 thereby moving the current cursor position on display 102 to the right one position.

A secondary function of directional input device 108, accessible via use of shift key 114 as described below, is editing an expression on display 102. The input of shift key 114 in conjunction with or prior to left arrow of directional input device 108 inputs a backspace command to processor 204 thereby deleting the character to the left of the current cursor position on display 102. The input of shift key 114 in conjunction with or prior to right arrow of directional input device 108 inputs a delete command to processor 204 thereby deleting the character to the right of the current cursor position on display 102.

The four remaining keys in row 110 are shift key 114, open parenthesis key 116, close parenthesis key 118, and power key 120.

Shift key 114 is used to access a second set of functions, i.e. secondary functions, assigned to the remaining keys on calculator 100. For example, user activating power key 120 turns on calculator 100; however, activation of power key 120 subsequent to activation of shift key 114 turns off the calculator. In a similar fashion, each of the remaining keys of calculator 100 has an assigned secondary function.

Open parenthesis key 116 inputs a beginning parenthesis in a user-entered expression. The secondary function of open parenthesis key 116 is to input a command causing calculator 100 to split a graphical output on display 102 such that one half of the display is a graph and the other half is numerical information related to the graph displayed.

Close parenthesis key 118 inputs an ending parenthesis in a user-entered expression. The secondary function of close parenthesis key 118 is to input a T variable in a user-entered expression.

Power key 120 turns on calculator 100 and, as described above, the secondary function of power key 120 is to turn off calculator 100. Additionally, power key 120 operates as a clear key after calculator 100 is turned on, i.e. the power key may be used to clear the displayed expression on display 102. Manipulation of shift key 114 followed by right arrow of directional input device 108 deletes input characters to the right of the current input position and manipulation of shift key 114 followed by left arrow of directional input device 108 deletes input characters to the left of the current input position.

Beginning in the upper left corner of four by four grid 112, the description of the remaining keys is now provided in a row, column order.

Row 1, column 1 key 122, i.e. the seven key, inputs a seven (7) value in a user-entered expression and has a secondary function of inputting a sin function in a user-entered expression. Row 1, column 2 key 124, i.e. the eight key, inputs an eight (8) value in a user-entered expression and has a secondary function of inputting a cos function in a user-entered expression. Row 1, column 3 key 126, i.e. the nine key, inputs a nine (9) value in a user-entered expression and has a secondary function of inputting a tan function in a user-entered expression. Row 1, column 4 key 128, i.e. the division key, inputs a division (/) function in a user-entered expression and has a secondary function of inputting a theta ($\theta$) variable in a user-entered expression.

Row 2, column 1 key 130, i.e. the four key, inputs a four (4) value in a user-entered expression and has a secondary function of inputting a square root function in a user-entered expression. Row 2, column 2 key 132, i.e. the five key, inputs a five-(5) value in a user entered expression and has a secondary function of inputting a squared function, i.e. raising a value to the second power, in a user-entered expression. Row 2, column 3 key 134, i.e. the six key, inputs a six (6) value in a user-entered expression and has a secondary function of inputting a value raised to the power of a subsequently entered value function, i.e. X raised to the power of Y, in a user-entered expression. Row 2, column 4 key 136, i.e. the multiplication key, inputs a multiplication (*) function in a user-entered expression and has a secondary function of inputting an X variable in a user-entered expression.

Row 3, column 1 key 138, i.e. the one key, inputs a one (1) value in a user-entered expression and has a secondary function of inputting an absolute value function in a user-entered expression. Row 3, column 2 key 140, i.e. the 2 key, inputs a two (2) value in a user-entered expression and has a secondary function of inputting a natural logarithm function in a user-entered expression. Row 3, column 3 key 142, i.e. the three key, inputs a three (3) value in a user-entered expression and has a secondary function of in putting eight logarithm function in a user-entered expression. Row 3, column 4 key 144, i.e. the minus key, inputs a subtraction (−) function in a user-entered expression and has a secondary function of inputting a NOT function in a user-entered expression.

Row 4, column 1 key 146, i.e. the execute key, inputs an execute command to calculator 100 and has a secondary function of inputting, a menu command to the calculator. Row 4, column 2 key 148, i.e. the zero key, inputs a zero (0) value in a user-entered expression and has a secondary function of inputting an e value in a user-entered expression. Row 4, column 3 key 150, i.e. the dot key, inputs a decimal point in a value entry and has a secondary function of in putting a pi constant value in a user-entered expression. Row 4, column 4 key 152, of i.e. the plus key, inputs an addition (+) function in a user-entered expression and has a secondary function of in putting a times ten to the power of a subsequently entered value, i.e. "*10^Y", in a user-entered expression.

Figure 3:
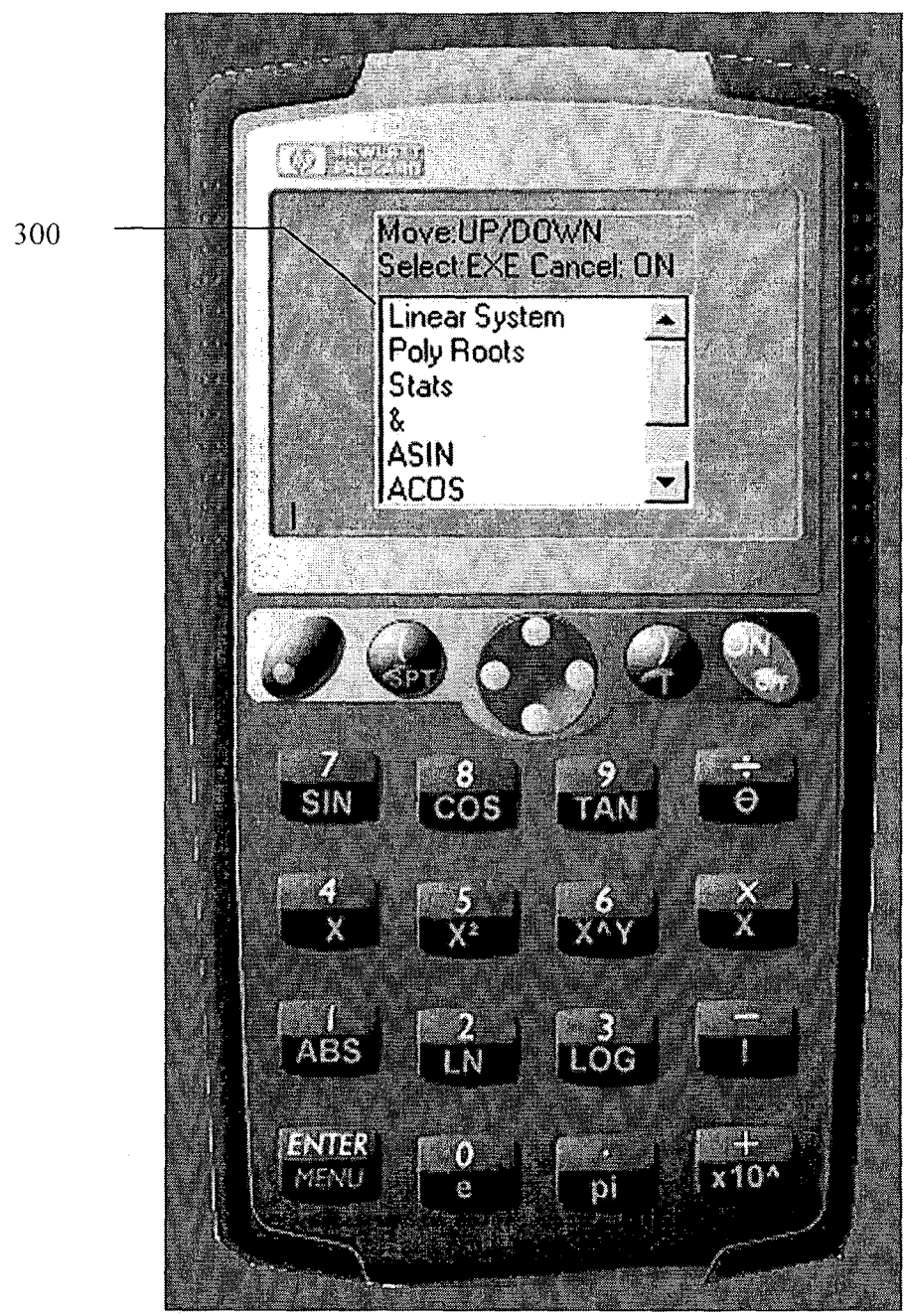
FIG. 3 illustrates a menu displayed on a display of the graphical calculator of FIG. 1 according to an embodiment of the present invention.

FIG. 3 illustrates a menu 300 displayed on display 102 according to an embodiment of the present invention. As described above, menu 300 is displayed in response to the user manipulating the secondary function, i.e. menu, of execute key 146. Menu 300 includes additional expressions able to be selected and input by a user (in the manner described above) to processor 204. The user manipulates directional input device 108 up arrow and/or down arrow to cause the highlighted menu item to move up/down one item. After the user-desired menu item is highlighted, the user manipulates execute key 146 (primary function) to input the highlighted menu item. If the user manipulates the power key 120, no input to processor 204 is generated and the menu 300 is no longer displayed on display 102.

Figure 2:
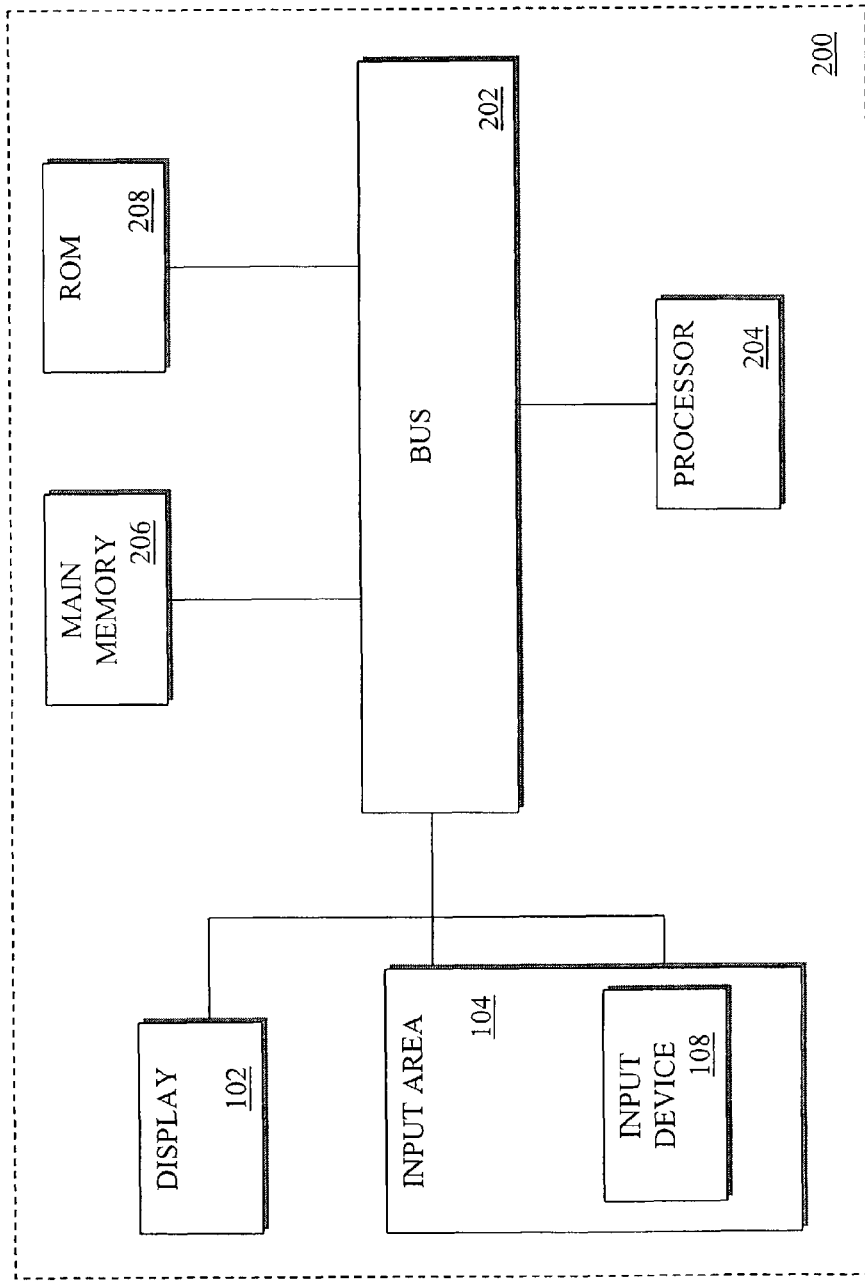
FIG. 2 is a high level block diagram of a graphical calculator according to an embodiment of the present invention.

FIG. 2 is a block diagram illustrating an exemplary calculator 100 upon which an embodiment of the invention may be implemented.

Calculator 100 includes a bus 202 or other communication mechanism for communicating information, and a processor 204 coupled with the bus 202 for processing information. In one particular embodiment, processor 204 is a 16 bit processor. Calculator 100 also includes a main memory 206, such as a random access memory (RAM) or other dynamic storage device, coupled to the bus 202 for storing data and expressions according to an embodiment of the present invention and instructions to be executed by processor 204. Main memory 206 also may be used for storing temporary variables or other intermediate information during execution of instructions to be executed by processor 204. In one particular embodiment, main memory 206 is an 8 Kilobyte RAM. Further, it is to be understood that in alternate embodiments, the components of calculator 100 may be combined onto a single integrated circuit, e.g. processor 204 and main memory 206 may be combined on a single "system on a chip."

Calculator 100 further includes a read only memory (ROM) 208 or other static storage device coupled to the bus 202 for storing static information and instructions for the processor 204. In one particular embodiment, ROM 208 is a 128 Kilobyte ROM.

Calculator 100 may be coupled via the bus 202 to a display 102, such as the above-described 96*64 pixel LCD, for displaying an interface to a user. An input area 104, as described above with reference to FIG. 1, is coupled to the bus 202 for communicating information, e.g. user-entered expressions and values, and command inputs to the processor 204. An input device 108, as described above with respect to FIG. 1, is part of input area 104 and communicates direction information and command selections to processor 204 and controls cursor movement on the display 102. This input device typically has two degrees of freedom in two axes, a first axis (e.g., x) and a second axis (e.g., y) allowing the device to specify positions in a plane.

The invention is related to the use of calculator 100, such as the depicted calculator of FIG. 2, to input and apply operations, e.g. expressions, to data and graph the results of operations by driving display 102. According to one embodiment of the invention, data is stored and accessed from main memory 206 by calculator 200 in response to processor 204 executing sequences of instructions contained in main memory 206 in response to input received via input area 104. A user interacts with the calculator 100 via a user interface displayed (as described below) on display 102.

Execution of the sequences of instructions contained in the main memory 206 causes the processor 204 to perform the process steps described below. In alternative embodiments, hard-wired circuitry may be used in place of or in combination with computer software instructions to implement the invention. Thus, embodiments of the invention are not limited to any specific combination of hardware circuitry and software.

According to an embodiment of the present invention, a user is able to easily graph user-entered expressions using a graphical calculator.

Figure 4A:
FIG. 4a-4k are views of use of a graphical calculator according to an embodiment of the present invention.

Three examples are now provided to facilitate description of the operation of the calculator according to an embodiment of the present invention. With reference to FIG. 4a, display 102 displays a user input of a mathematical expression 402, i.e. "sin(x)", by sequential manipulation of the shift key 114, the seven key 122, the shift key 114, and the multiplication key 136. The upright bar symbol, "|", at the end of mathematical expression 402 indicates the cursor position to the user during editing/input of the user-entered expression, i.e. mathematical expression 402.

Figure 4B:
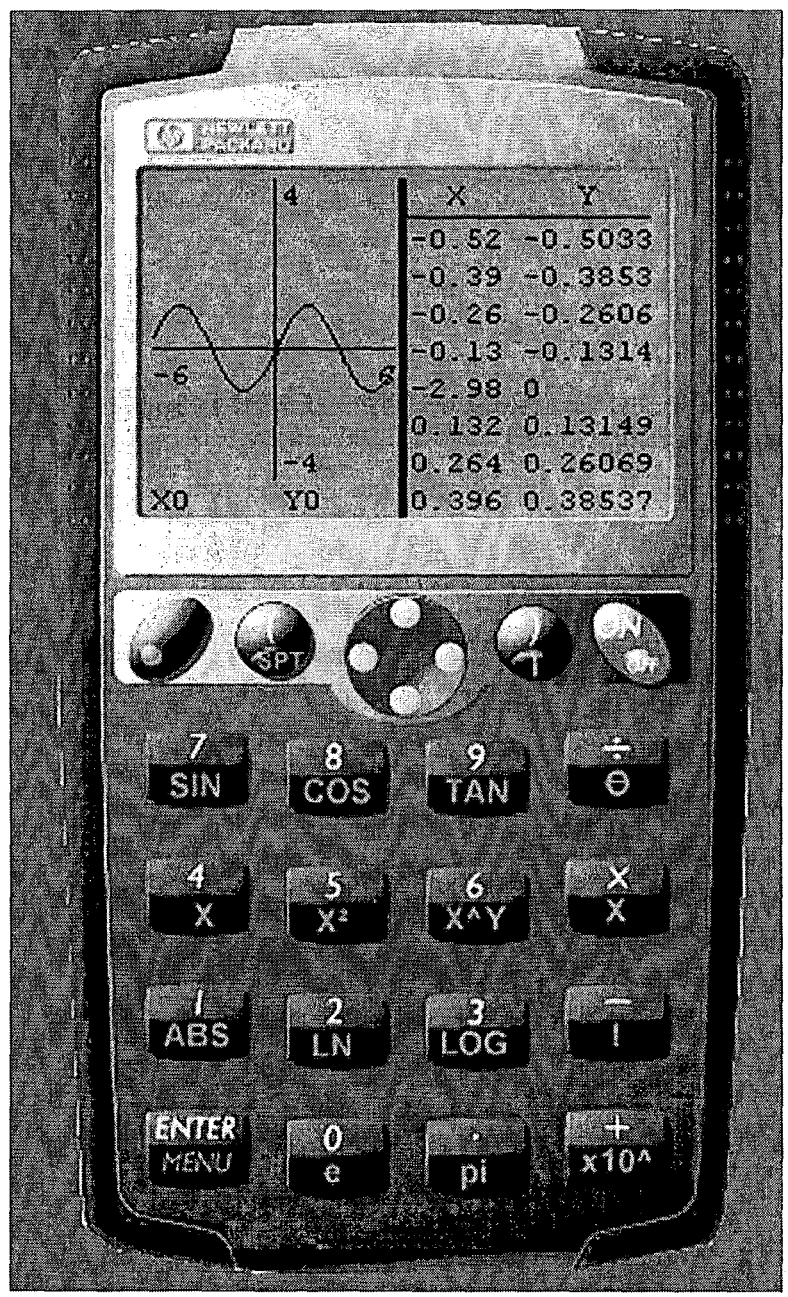

After the user manipulates the execute key 146, processor 204 evaluates the input mathematical expression 402 and drives display 102 to display the result 404, i.e. a graphical representation of a sine wave 406 in a two dimensional Cartesian coordinate system and a listing of coordinate values 408 for select points on sine wave 406, to the user as depicted in FIG. 4b. The coordinate values 408 are "centered" around a cursor position, initially the middle set of values in the listing is at the origin (0, 0), and each set of values above/below the middle set is the coordinate position of the next pixel along the graphed expression, i.e. sine wave 406, forward/backward of the current cursor position. Advantageously, the user need only input an expression to be graphed to processor 204 of calculator 100 and the processor drives display 102 to graph the mathematical expression. The user is not required to enter a graphing mode or manipulate a graphing key.

Figure 4C:
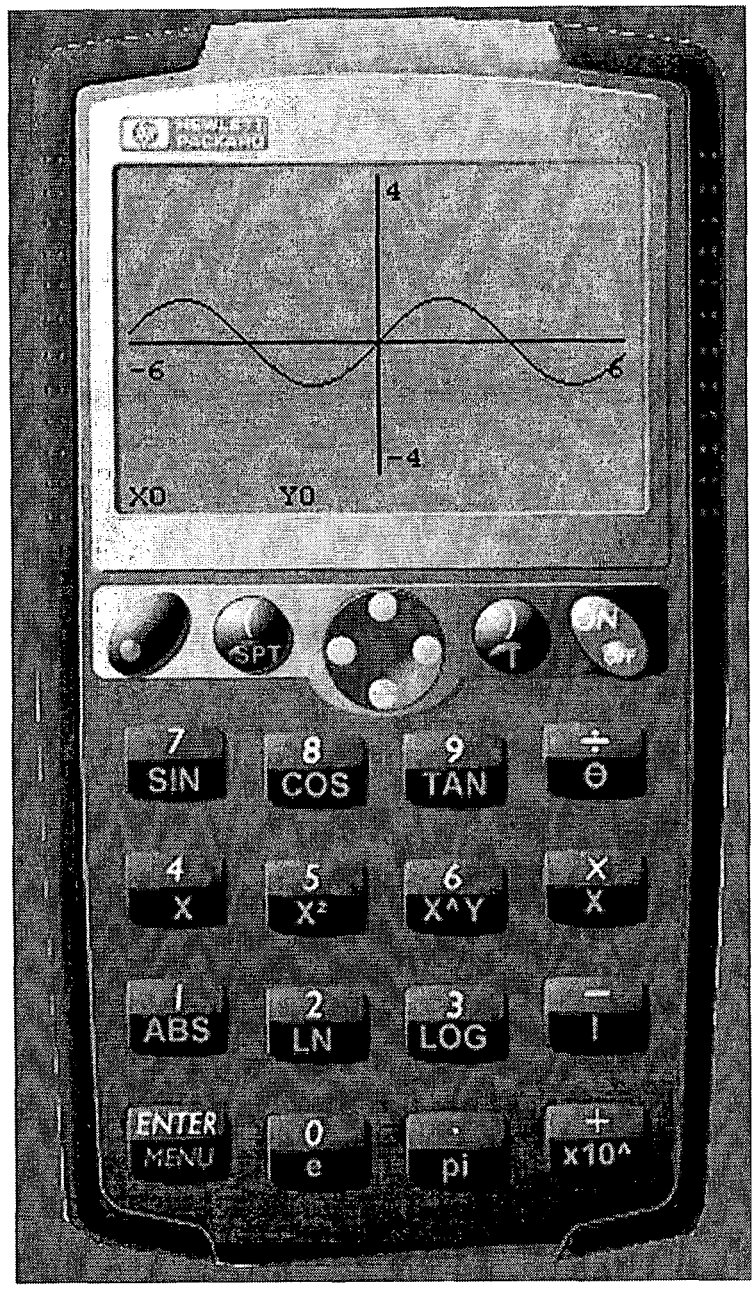

The user may manipulate shift key 114 followed by the open parenthesis key 116 to command calculator 100 to display either sine wave 406, e.g. FIG. 4c, or the sine wave and the listing 408 combined as in FIG. 4b.

Figure 4D:
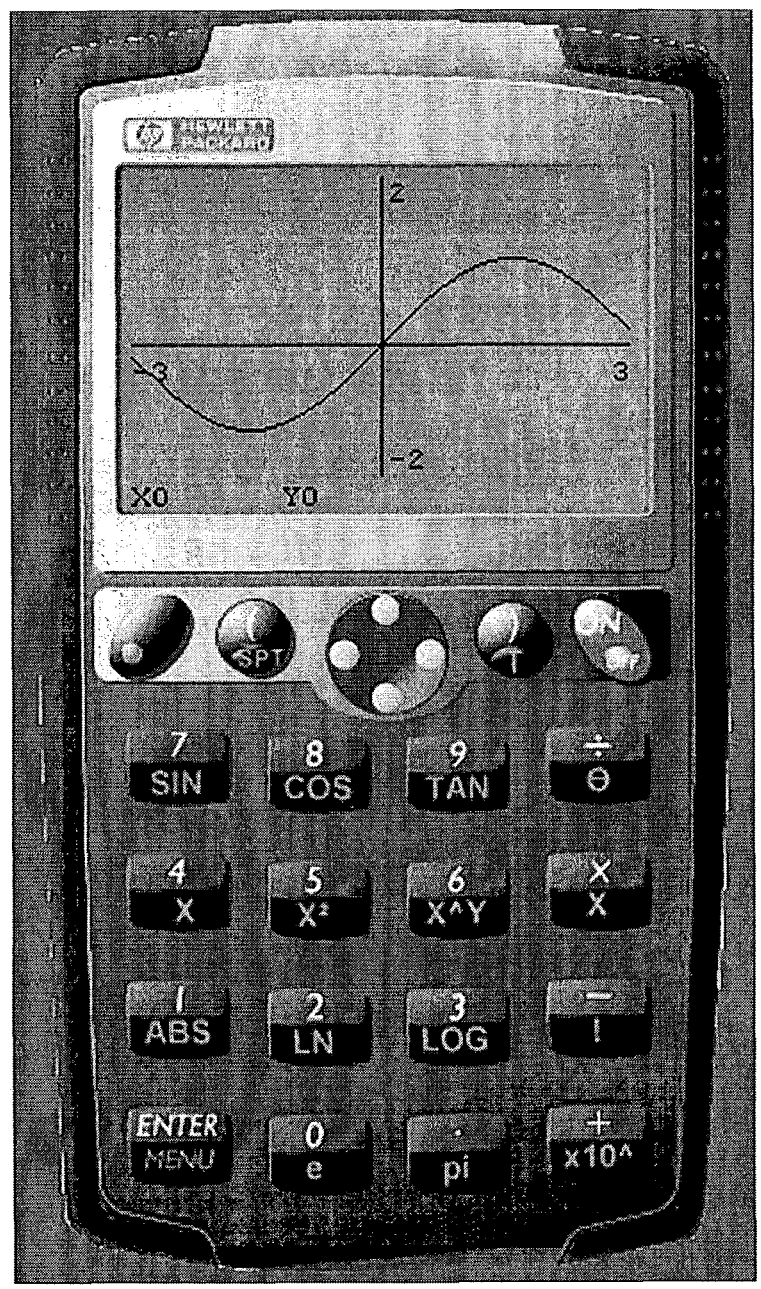

The user may zoom in, i.e. increase the scale of the displayed graph, by manipulation of addition key 152. FIG. 4d depicts the result of input of a zoom in command starting from FIG. 4c.

Figure 4E:
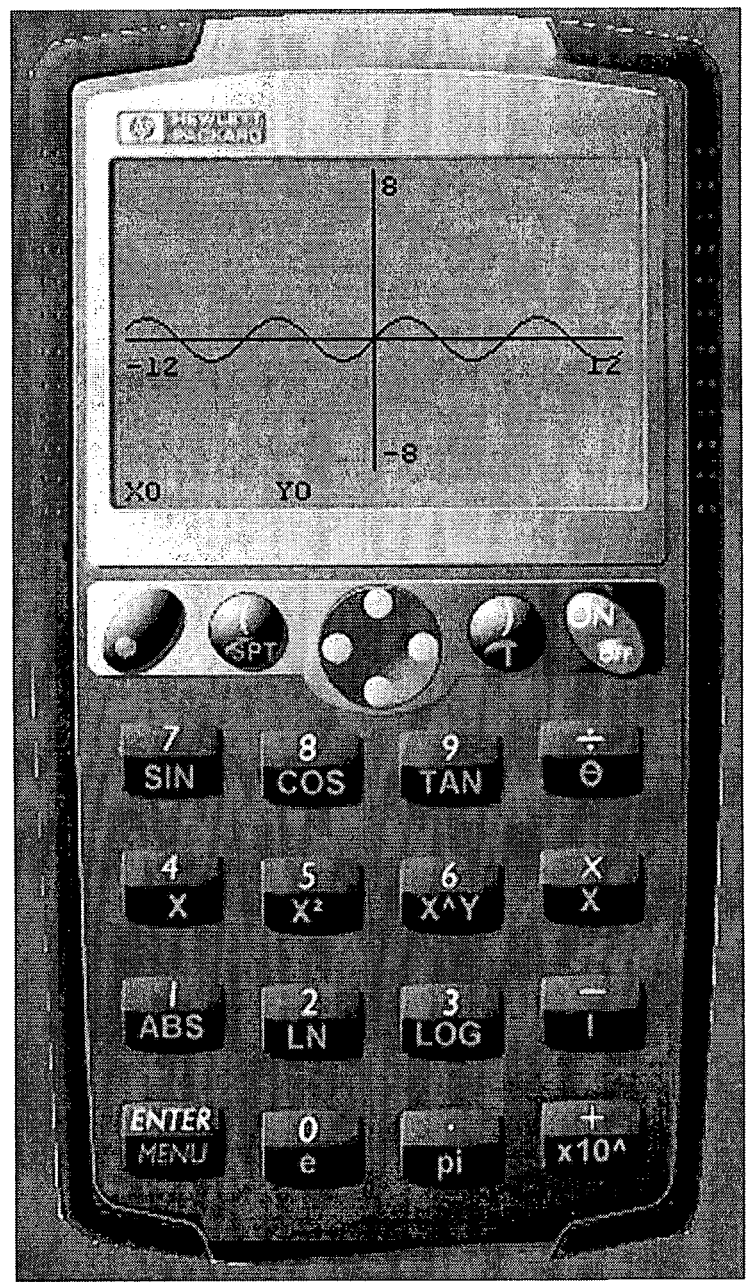

Alternatively, the user may zoom out, i.e. decrease the scale of the displayed graph, by manipulation of subtraction key 144. FIG. 4e depicts the result of input of a zoom out command starting from FIG. 4c.

Figure 4F:
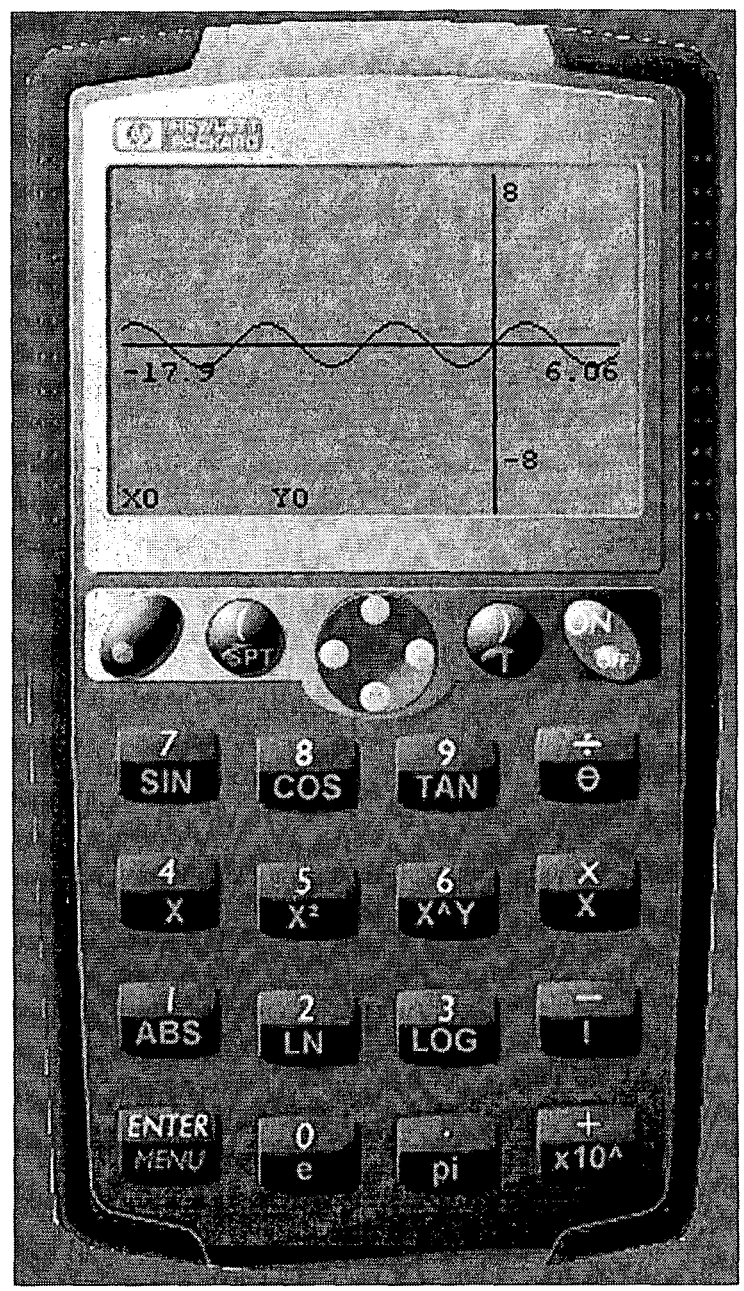
Figure 4G:
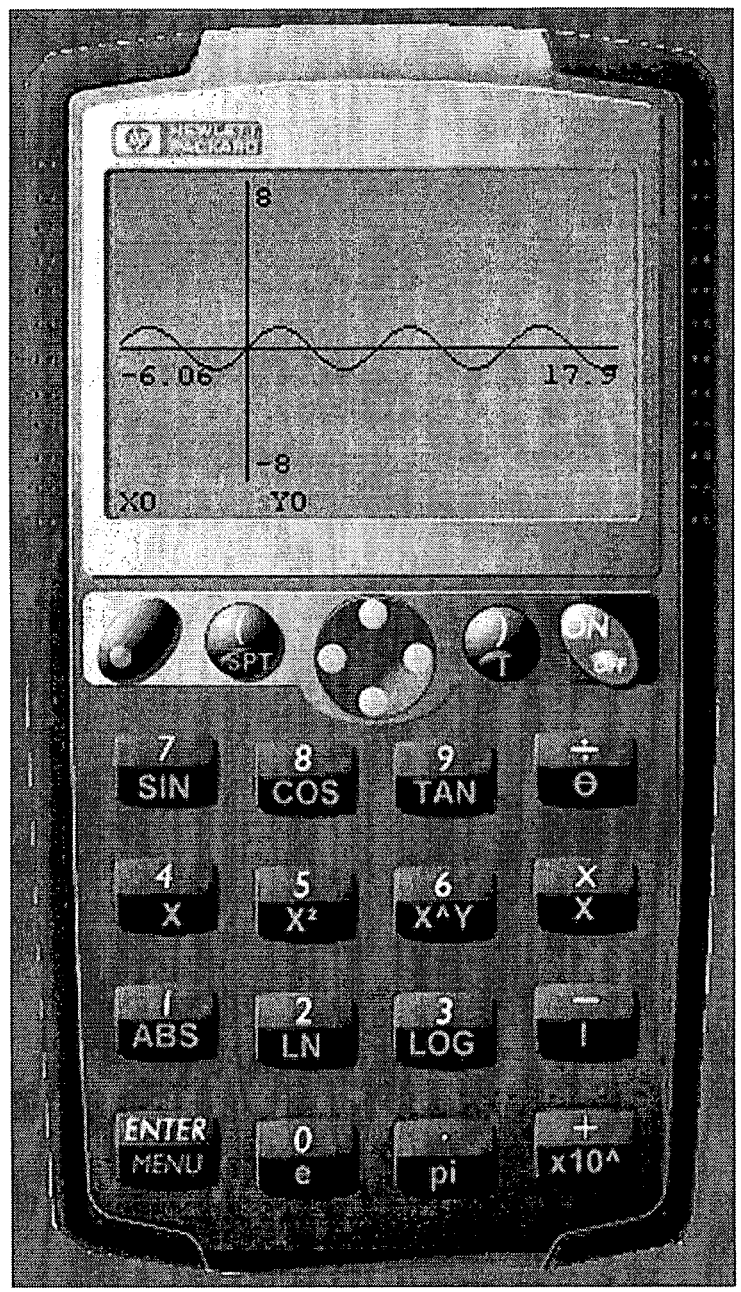

As depicted in FIG. 4f, the user may shift the coordinate system to the right by input of a shift right command by sequential manipulation of shift key 114 and the left arrow of directional input device 108. Alternatively, as depicted in FIG. 4g, the user may shift the coordinate system to the left by input of a shift left command by sequential manipulation of shift key 114 and the right arrow of directional input device 108.

Figure 4H:
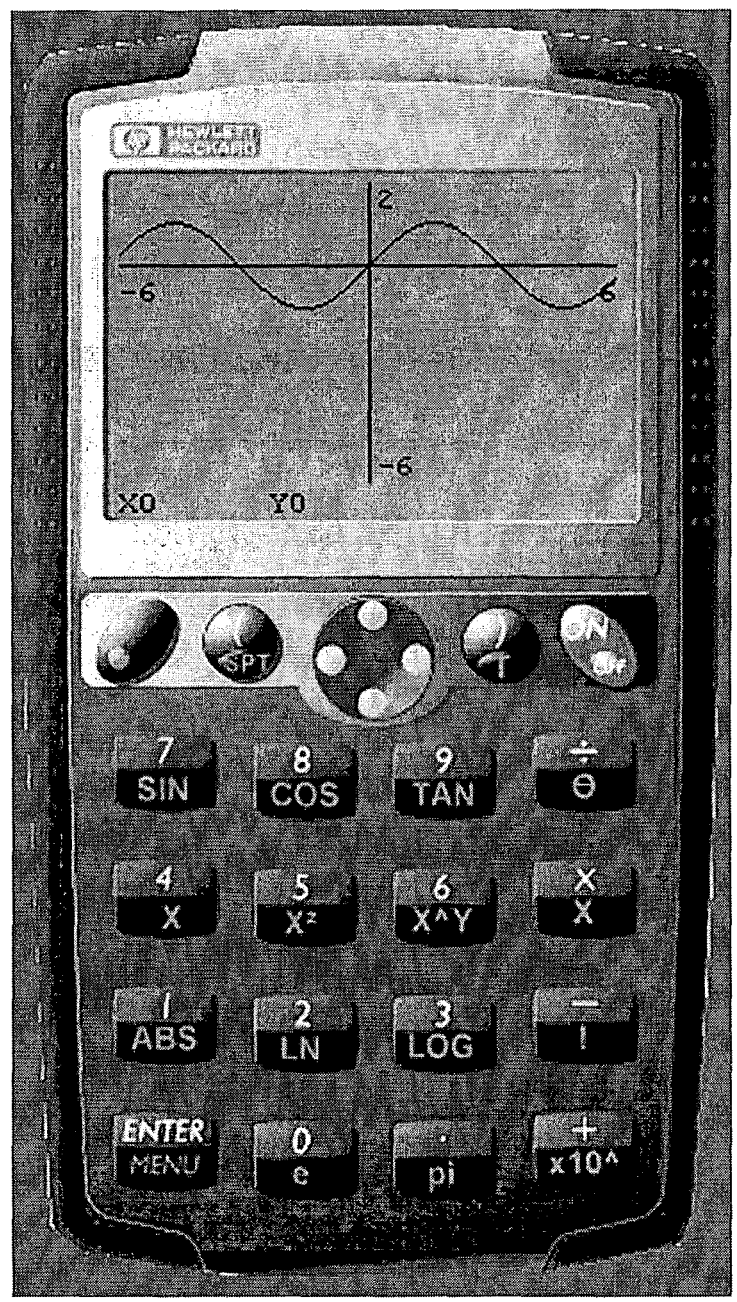
Figure 4I:
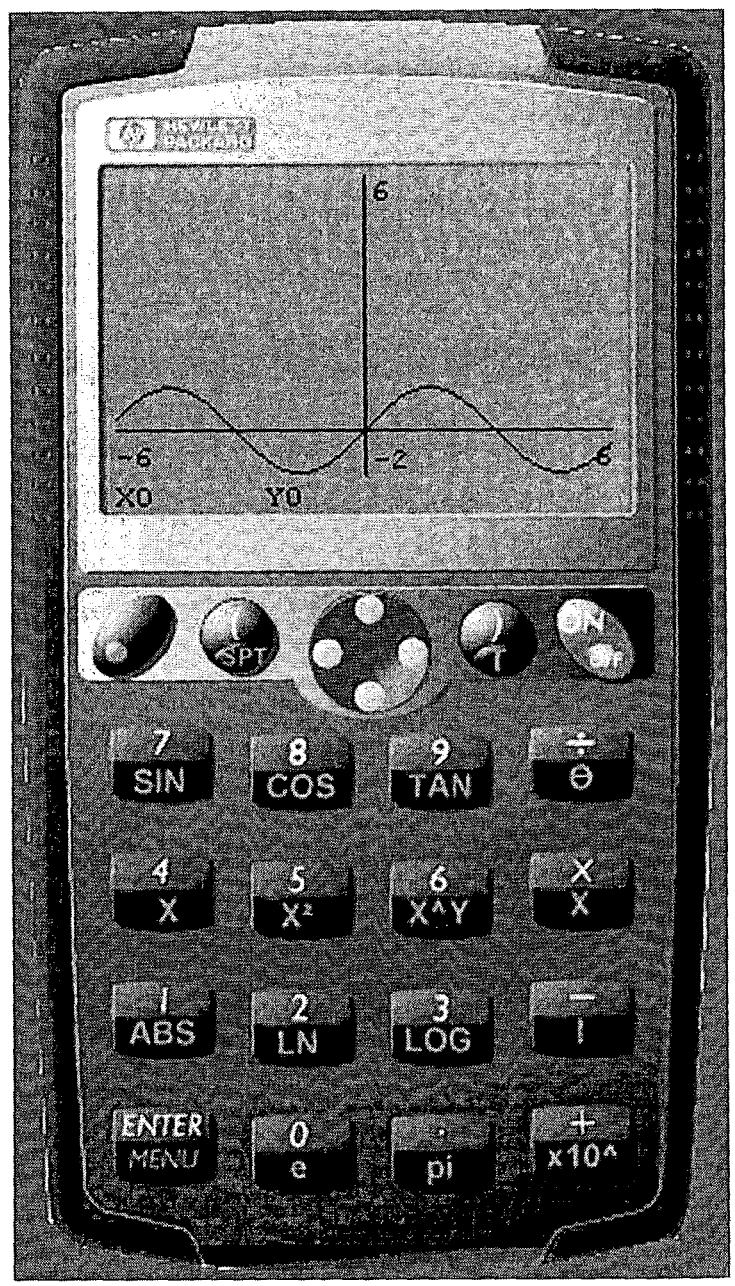

As depicted in FIG. 4h, the user may shift the coordinates system upward by input of a shift up command by sequential manipulation of shift key 114 and the up arrow of directional input device 108. Alternatively, as depicted in FIG. 4i, the user may shift the coordinate system downward by input of a shift down command by sequential manipulation of shift key 114 and the down arrow of directional input device 108.

A cursor indicates a position on the displayed graphical representation of the user-entered mathematical expression. Initially, the cursor is located at the origin of the coordinate system, e.g. x=0, y=0 for a two-dimensional Cartesian coordinate system as depicted in FIG. 4c. Further advantageously, the user desiring to view the value of a specific position on the displayed graphical representation different from the origin may move the cursor along the graphical representation by manipulation of either the left arrow or right arrow of directional input device 108.

Figure 4J:
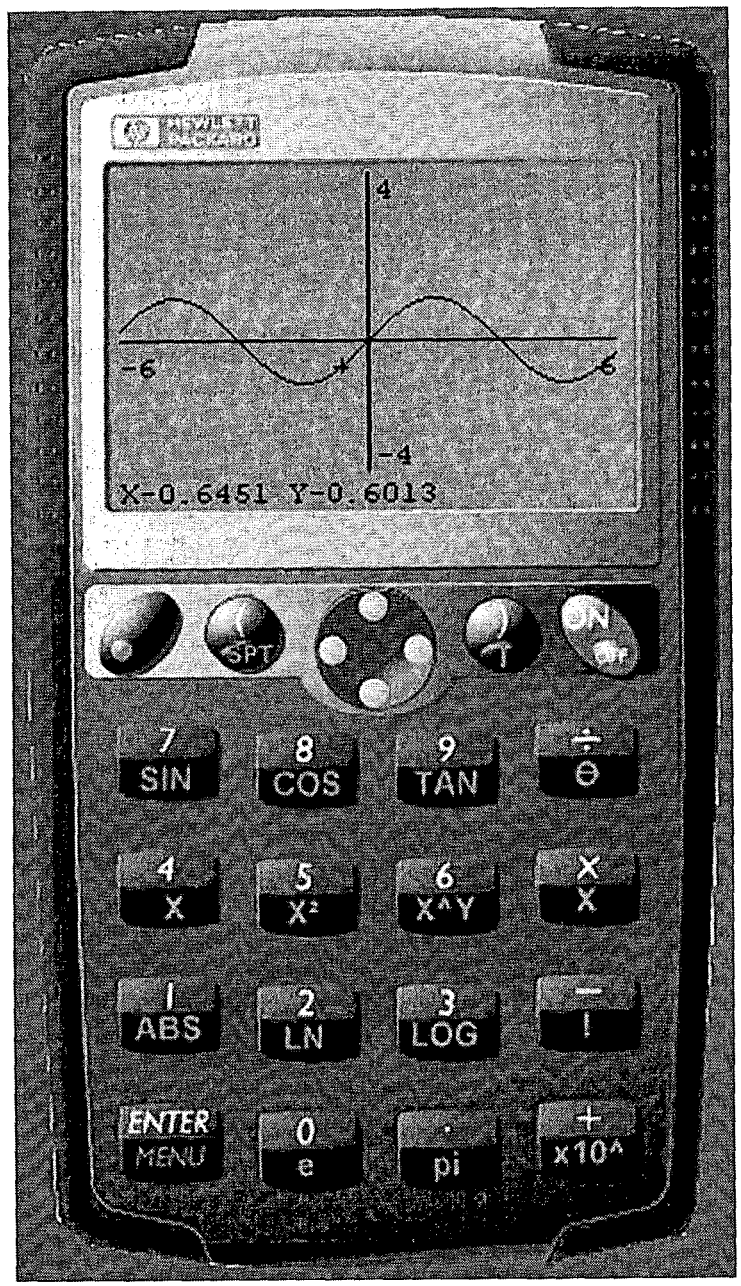

As depicted in FIG. 4j, the user has input the left arrow of directional input device 108 ten times starting from the displayed graph of FIG. 4c. The x and y coordinate values are displayed at the bottom of display 102.

Figure 4K:
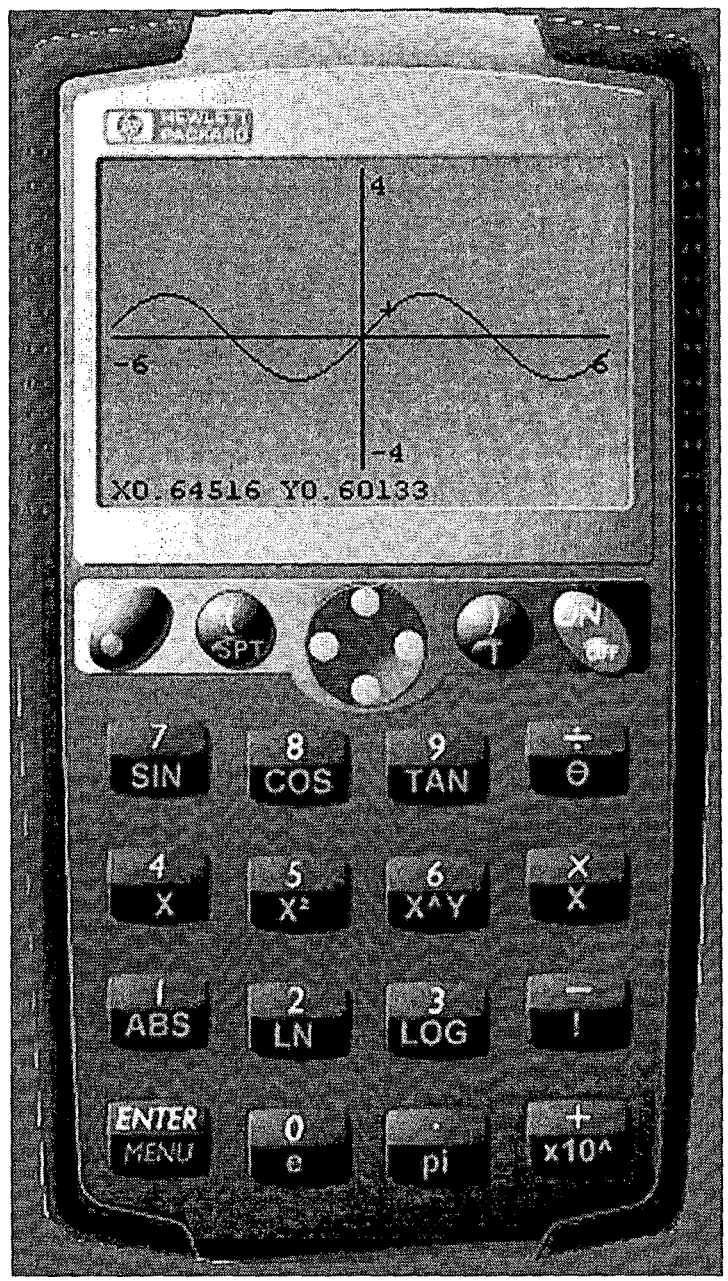

As depicted in FIG. 4k, the user has input the right arrow of directional input device 108 ten times starting from the displayed graph of FIG. 4c. The x and y coordinate values are displayed at the bottom of display 102.

Figure 5A:
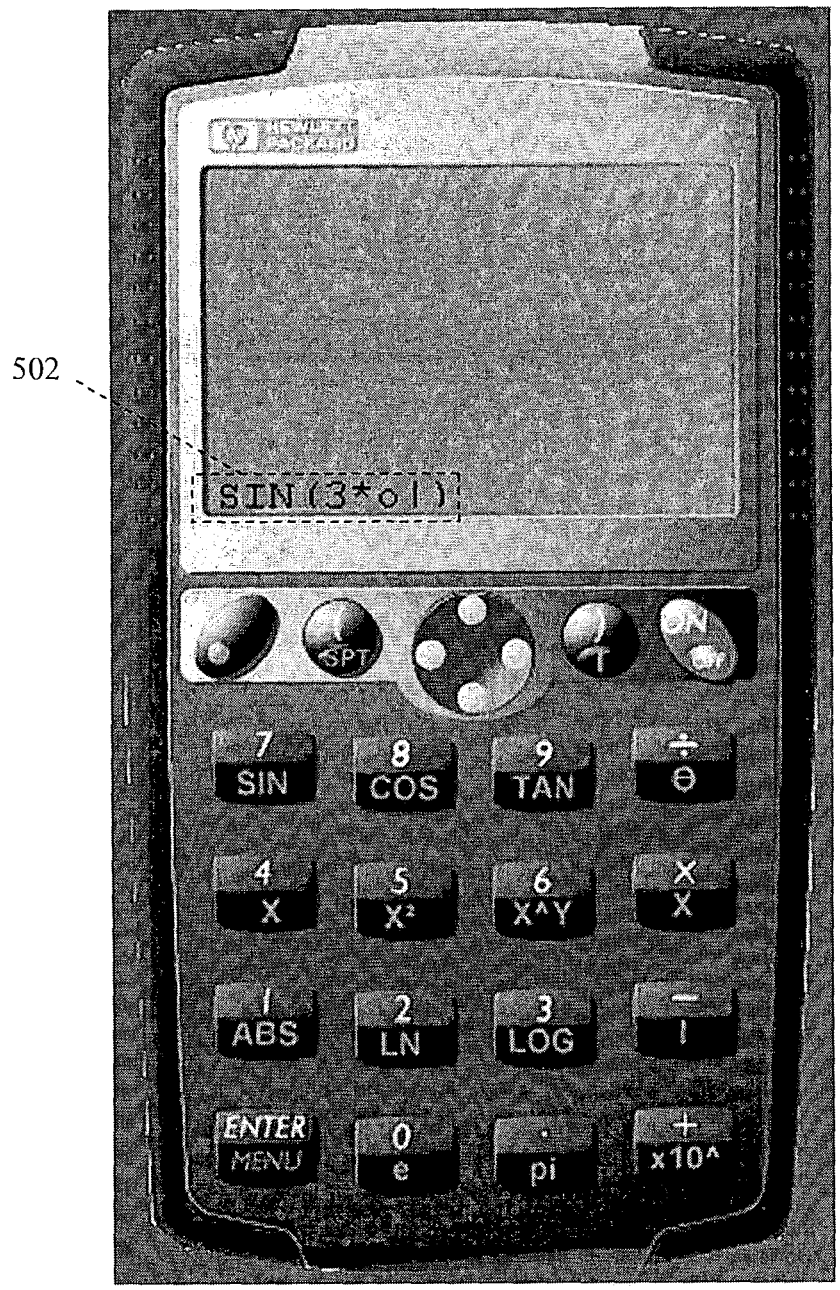
FIGS. 5a-5c are views of another use of a graphical calculator according to an embodiment of the present invention.

With reference to FIG. 5a, display 102 displays a user input of a mathematical expression 502, i.e. "sin(3θ)", by sequential manipulation of the shift key 114, the seven key 122, the three key 142, the multiplication key 146, the shift key 114, and the division key 128. The upright bar symbol, "|", at the end of mathematical expression 502 indicates the cursor position to the user during editing/input of the user-entered expression, i.e. mathematical expression 502.

Figure 5B:
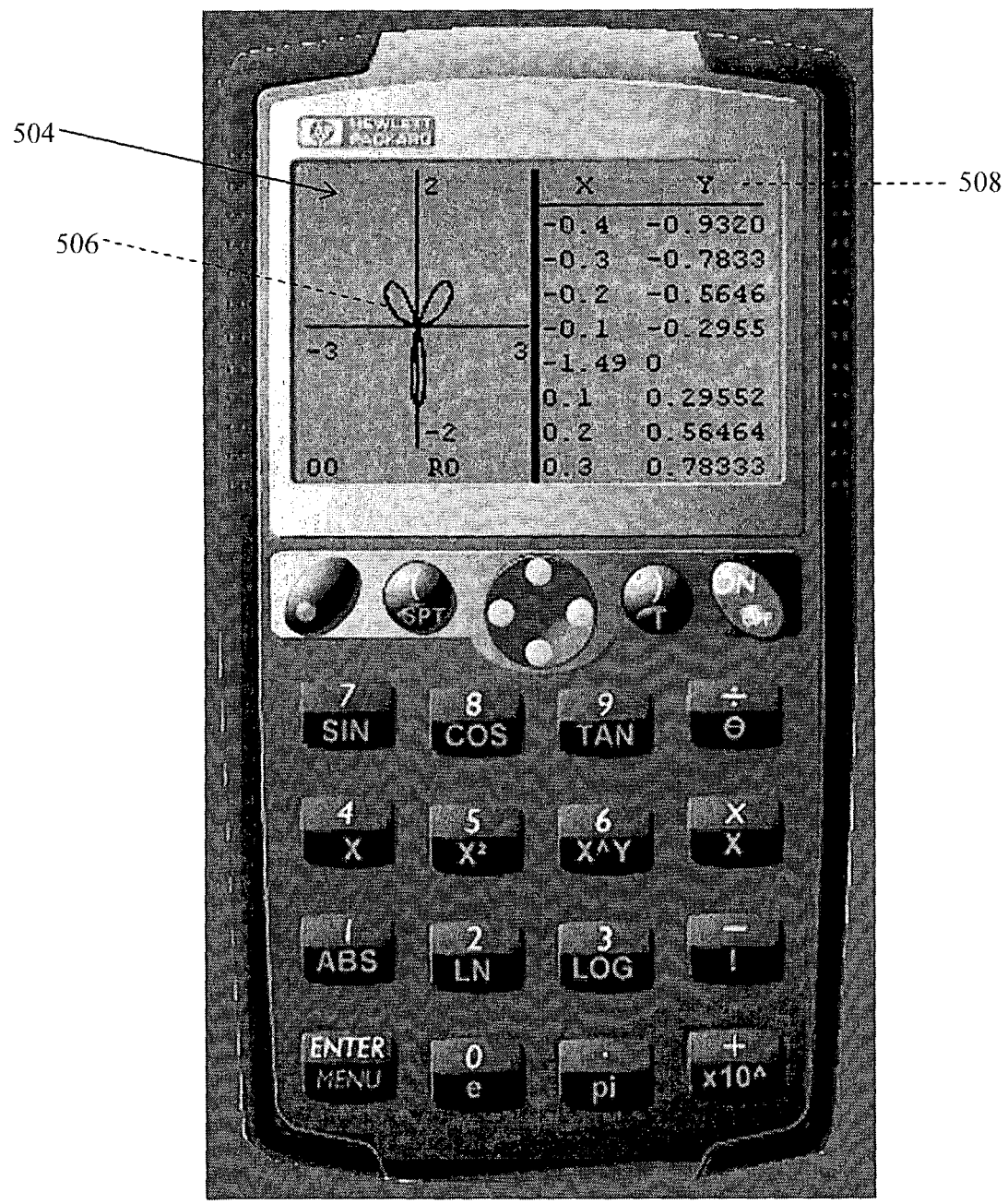

After the user manipulates the execute key 146, processor 204 evaluates the input mathematical expression 502 and drives display 102 to display the result 504, i.e. a graphical representation of a sine wave 506 in a polar coordinate system and a listing of coordinate values 508 for select points on sine wave 506, to the user as depicted in FIG. 5b. The values 508 include two columns representing the angular value and the radius value for points along the expression, i.e., sine wave 506. Specifically, and similar to the Cartesian coordinate system-based display described above, the middle set of values in the listing is the current cursor position and the value sets above/below the middle correspond to different values of the angle value at a regular interval used to draw the graph. The angle value varies from 0 to 1 in order to draw the graphical representation of sine wave 506. Advantageously, the user need only input an expression to be graphed to processor 204 of calculator 100 and the processor drives display 102 to graph the mathematical expression. The user is not required to enter a graphing mode or manipulate a graphing key.

Figure 5C:
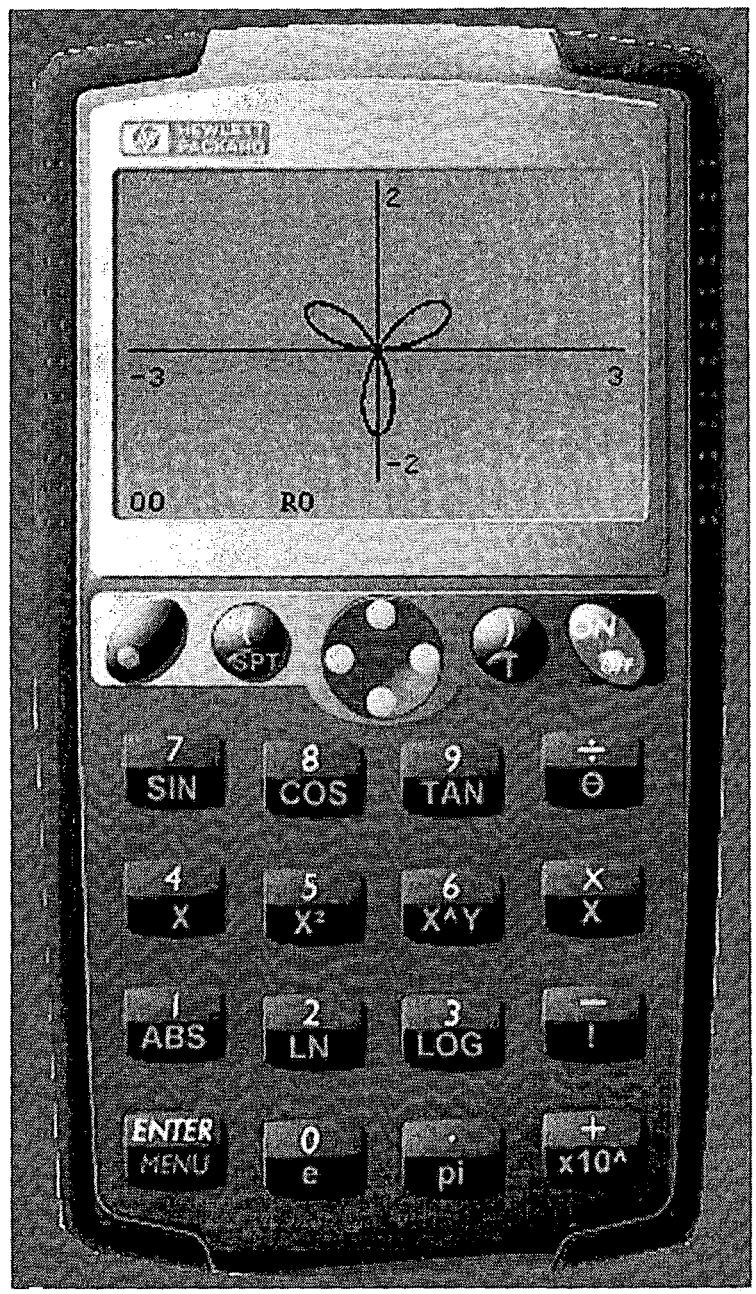

The user may manipulate shift key 114 followed by the open parenthesis key 116 to command calculator 100 to display either sine wave 506, e.g. FIG. 5c, or the sine wave and the listing 508 combined as in FIG. 5b.

Figure 6A:
FIG. 6a-6c are views of another use of a graphical calculator according to an embodiment of the present invention.
Figure 6B:
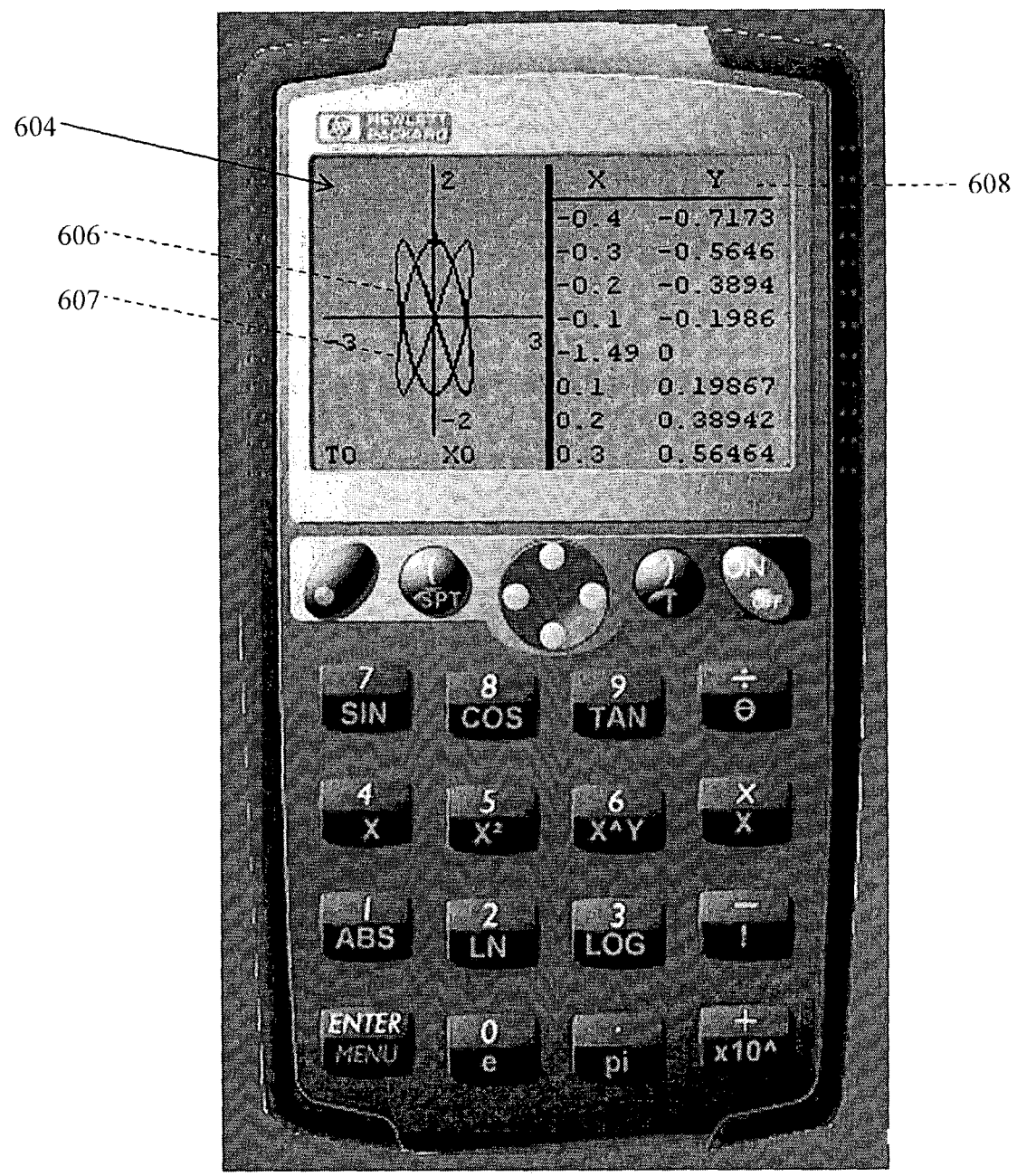
Figure 6C:
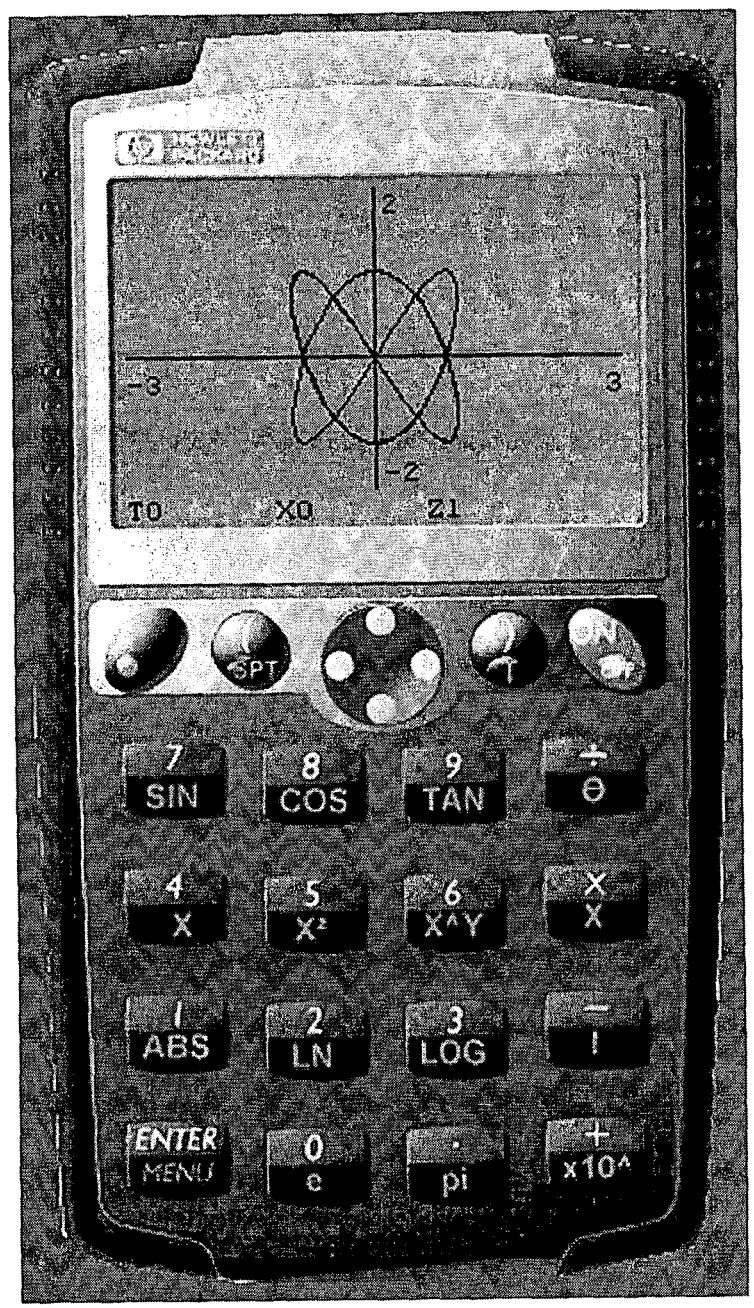

A parametric mode may be used by the user as depicted in FIGS. 6a-6c. With reference to FIG. 6a, display 102 displays a user input of a mathematical expression 602, i.e. "sin(2T)&cos(3T)", by sequential manipulation of the shift key. 114, the seven key 122, the two key 140, the multiplication key 136, the shift key 114, the close parenthesis key 118, the right arrow of the directional input device 108, the shift key 114, the execute key 146, highlighting the & symbol in the displayed menu 300 and manipulation of the execute key 146, the shift key 114, the eight key 124, the three key 142, the multiplication key 136, the shift key 114, and the close parenthesis key 118. The upright bar symbol, "|", at the end of mathematical expression 602 indicates the cursor position to the user during editing/input of the user-entered expression, i.e. mathematical expression 602.

After the user manipulates the execute key 146, processor 204 evaluates the input mathematical expression 602 and drives display 102 to display the result 604, i.e. a graphical representation of a sine wave 606 and a cosine wave 607 in a polar coordinate system and a listing of coordinate values 608 for select points on sine wave 606 and cosine wave 607, to the user as depicted in FIG. 6b. The values 608 include two columns representing the angular value and the radius value for points along the expression, i.e., sine wave 606 and cosine wave 607. Specifically, and similar to the Cartesian coordinate system-based display described above, the middle set of values in the listing is the current cursor position and the value sets above/below the middle correspond to different values of the angle value at a regular interval used to draw the graph.

The angle value varies from 0 to 1 in order to draw the graphical representation of sine wave 606 and cosine wave 607. Advantageously, the user need only input an expression to be graphed to processor 204 of calculator 100 and the processor drives display 102 to graph the mathematical expression. The user is not required to enter a graphing mode or manipulate a graphing key.

The user may manipulate shift key 114 followed by the open parenthesis key 116 to command calculator 100 to display either sine wave 606 and cosine wave 607, e.g. FIG. 6c, or the sine wave, cosine wave and the listing 608 combined as in FIG. 6b.

If the user attempts to input a mathematical expression to be graphed which includes more than one type of variable, i.e. the user attempts to graph expressions having differing coordinate systems, calculator 100 displays an error message to the user.

Figure 7:
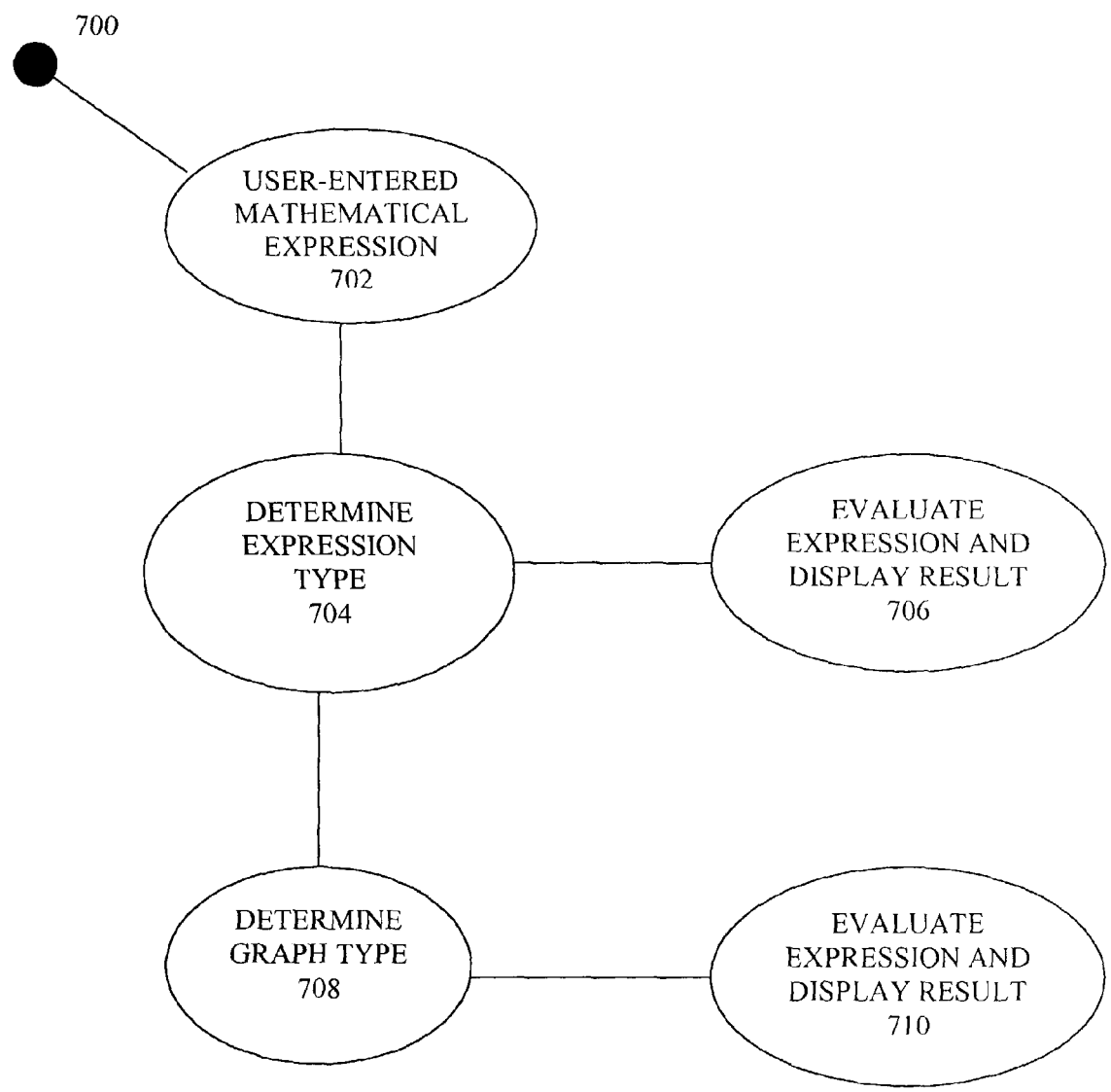
FIG. 7 is a high level flow chart of the flow of control of a graphical calculator according to an embodiment of the present invention.
Figure 8:
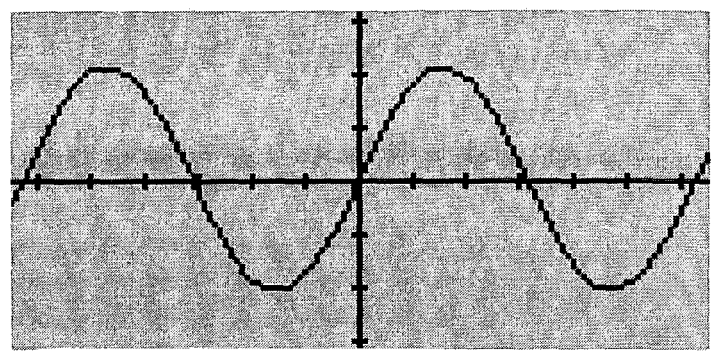
FIG. 8 is a graphical representation of a sine wave.

A flow of control of a process according to an embodiment of the present invention is now described with respect to FIG. 7.

The process begins at step 700. Upon receipt of a user-entered mathematical expression, at processor 204, the flow proceeds to step 702 wherein the processor stores the received expression into main memory 206. After the expression is stored into memory 206, the process flow proceeds to step 704 wherein the processor evaluates the received expression and determines whether the expression includes one of a set of specific variables indicating a request for a graphical representation of the expression, i.e. a determination of whether the user is requesting generation of a graph. For example, the set of variables used in a particular embodiment according to the present invention includes X, θ, and τ.

If processor 204 determines at step 704 that the expression is not a graph request, the flow of control proceeds to step 706 wherein the processor executes instructions to evaluate the user-entered expression and generate a result. The processor 204 then drives display 102 to display the result to the user.

If processor 204 determines at step 704 that the expression includes one of the specified variables, the flow of control proceeds to step 708 wherein the processor executes instructions to determine the specific graph type requested based on the specific variable used in the user-entered expression. For example, if the user includes an X variable in the expression, the graph type generated uses a two dimensional Cartesian coordinate system; if the user includes an θ variable, the graph type generated uses a polar coordinate system; and if the user includes an T variable in the expression, the graph type generated uses a Cartesian plan.

Further, as part of the step 708 determination, processor 204 determines whether more than one specific variable of a different type is included in the user-entered expression. If more than one specific variable of differing type is included, the processor generates an error and drives display 102 to display the error to the user.

After processor 204 determines the graph type at step 708, the flow of control proceeds to step 710 wherein the processor evaluates the user-entered expression and displays the result to the user. Processor 204 determines a specific set of points on the graph of the expression for display alongside the determined graphical representation of the expression and drives display 102 to display a listing of the points and the graphical representation of the expression to the user. As described above, the user may toggle between display of both the listing of points and graphical representation of the expression and display of only the graphical representation of the expression.

A high level pseudo-code listing of an embodiment according to the present invention is listed in Listing 1 below.

Listing 1

```
Do
    Wait for user key
    If Key is not Enter, execute appropriate action
    If Key is Enter,
    {
    if 'X' is present in the expression,
        if T or q are not present in the expression
            enter Function drawing mode
        else
            display error
    if 'q' is present in the expression,
        if T or X are not present in the expression
            enter Polar mode drawing mode
        else
            display error
    if 'T' is present in the expression,
        if q or X are not present in the expression
            enter Parametric drawing mode
        else
            display error
    }
```

It will be readily seen by one of ordinary skill in the art that the present invention fulfills all of the objects set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

For example, as depicted in FIGS. 1 and 3-5, key labels may differ according to different embodiments, e.g. the division key 128 in FIG. 1 is represented by a slash mark whereas in FIGS. 4-5 the same key is represented by a ÷ symbol. The symbols are interchangeable and represent the same calculator functionality.

Further, although a specific set of variables indicative of a request for a graphical representation of an expression is described as including X, θ, and τ, it is to be understood that other variables may be used according to specific embodiments.

What is claimed is:

1. A method of graphing an expression on a calculator display comprising the step of:
    graphing an evaluation of a received expression on a calculator display in response to a user actuating an execute key without having to additionally actuate a separate graphing key;
    determining select points on the received graphed expression and displaying a listing of the determined select points on the calculator display; and
    in response to receiving a toggle display command, switching between displaying only a graph of the evaluation of the received expression on the calculator display and determining the select points on the received graphed expression and displaying at the same time a listing of the determined select points and a graph of the evaluation of the received expression on the calculator display.

2. The method as claimed in claim 1, wherein the expression includes functions selected from the set of: algebraic functions, trigonometric functions, exponential functions, and logarithmic functions.

3. The method as claimed in claim 1, wherein the graphing step further comprises the steps of:
    based on only the received expression to be graphed, determining the graph type to be graphed on the calculator display.

4. The method as claimed in claim 3, wherein the graph type includes one of a two dimensional Cartesian coordinate system graph, a polar coordinate system graph, a Cartesian plan graph, and a polar plan graph.

5. The method as claimed in claim 1, further comprising the step of:
in response to receipt of a user command, modifying the scale of the received graphed expression on the calculator display.

6. The method as claimed in claim 1, further comprising the step of:
in response to receipt of a user command, modifying the position of the received graphed expression on the calculator display.

7. The method as claimed in claim 1, further comprising the step of:
in response to receipt of a user command, displaying a cursor at a position on the received graphed expression on the calculator display.

8. The method as claimed in claim 7, further comprising the step of:
in response to receipt of a user command, displaying the cursor at a different position on the received graphed expression on the calculator display.

9. The method as claimed in claim 7 wherein the calculator display includes a display of the coordinate values of the current cursor position.

10. The method as claimed in claim 3, further comprising the step of:
if the received expression to be graphed includes more than one graph type,
displaying an error message on the calculator display.

11. A calculator for graphing a user-entered expression, the calculator comprising:
means for receiving and displaying a user-entered expression;
means for graphing an evaluation of the user-entered expression on a calculator display in response to actuating an execute key without having to additionally actuate a separate graphing key or enter into a separate graphing mode;
means for determining select points on the received graphed expression and displaying a listing of the determined select points on the calculator display; and
means for receiving a toggle display command and switching between displaying only a graph of the evaluation of the received expression on the calculator display and determining select points on the received graphed expression and displaying at the same time a listing of the determined select points and a graph of the evaluation of the received expression on the calculator display.

12. The calculator as claimed in claim 11, wherein the expression includes functions selected from the set of: algebraic functions, trigonometric functions, exponential functions, and logarithmic functions.

13. The calculator as claimed in claim 11, wherein the means for graphing further comprise:
means for determining the graph type to be graphed on the calculator display.

14. The calculator as claimed in claim 13, wherein the graph type includes one of a two dimensional Cartesian coordinate system graph, a polar coordinate system graph, and a Cartesian plan graph, and a polar plan graph.

15. The calculator as claimed in claim 11, further comprising:
means for modifying the scale of the received graphed expression on the calculator display responsive to receipt of a user command.

16. The calculator as claimed in claim 11, further comprising:
means for modifying the position of the received graphed expression on the calculator display responsive to receipt of a user command.

17. The calculator as claimed in claim 11, further comprising:
means for modifying the position of a cursor displayed at a position on the received graphed expression on the calculator display.

18. The calculator as claimed in claim 13, further comprising:
means for determining if the received expression to be graphed includes more than one graph type and if the received expression to be graphed includes more than one graph type means for displaying an error message.

19. A calculator comprising:
a keypad operable by a user to enter an expression;
a calculator display operably associated with the keypad, the calculator display operable to display the expression; and
a processor executable to:
graph the evaluation on the calculator display in response to the user actuating an execute key without having to separately actuate a graphing key or enter into a graphing mode;
determine select points on the received graphed expression and displaying a listing of the determined select points on the calculator display; and
in response to receiving a toggle display command, switch between displaying only a graph of the evaluation of the received expression on the calculator display and determining select points on the received graphed expression and displaying at the same time a listing of the determined select points and a graph of the evaluation of the received expression on the calculator display.

* * * * *

UNITED STATES PATENT AND TRADEMARK OFFICE
CERTIFICATE OF CORRECTION

| | |
|---|---|
| PATENT NO. | : 8,832,562 B2 |
| APPLICATION NO. | : 10/636752 |
| DATED | : September 9, 2014 |
| INVENTOR(S) | : Cyrill de Brebisson |

It is certified that error appears in the above-identified patent and that said Letters Patent is hereby corrected as shown below:

In the Claims

In column 11, line 48, in Claim 11, delete "determining" and insert -- determining the --, therefor.

Signed and Sealed this
Twenty-third Day of December, 2014

Michelle K. Lee
*Deputy Director of the United States Patent and Trademark Office*